United States Patent

Ouvrard

[11] Patent Number: 5,595,229
[45] Date of Patent: Jan. 21, 1997

[54] SELF-WINDING BLIND

[75] Inventor: Gaston Ouvrard, Bressuire, France

[73] Assignee: Farnier & Penin SNC, Bressuire, France

[21] Appl. No.: 496,530

[22] Filed: Jun. 29, 1995

[30] Foreign Application Priority Data

Jul. 29, 1994 [FR] France .................................. 94 09452

[51] Int. Cl.⁶ .................................................. E04F 10/06
[52] U.S. Cl. ...................................... 160/23.1; 160/370.22
[58] Field of Search ............................ 160/23.1, 370.22, 160/84.07, 173 R, 262, 290.1, 24, 265

[56] References Cited

U.S. PATENT DOCUMENTS

| | | | |
|---|---|---|---|
| 3,075,805 | 1/1963 | Golde et al. | 160/262 X |
| 5,197,526 | 3/1993 | Schon | 160/84.07 |
| 5,207,257 | 5/1993 | Rupel et al. | 160/84.07 |

FOREIGN PATENT DOCUMENTS

| | | |
|---|---|---|
| 3414250 | 4/1984 | European Pat. Off. . |
| 0534261 | 9/1992 | European Pat. Off. . |

Primary Examiner—David M. Purol
Attorney, Agent, or Firm—Sixbey Friedman Leedom & Ferguson; Gerald J. Ferguson, Jr.; Thomas W. Cole

[57] ABSTRACT

The self-winding blind includes a fabric having a free edge fitted with a pull-bar and including a first segment parallel to the winding axis and at least one second segment inclined relative to said axis towards the housing. The pull-bar is constituted by a portion fixed to the first segment, and at least one portion hinged to the fixed portion in order to pivot about an axis substantially perpendicular to the plane containing the wound-out fabric. A flexible cord associated with a resilient tension member links the corner between the second segment and the side edge to the pull-bar by extending through a guide support disposed at the free end of the hinged portion.

13 Claims, 3 Drawing Sheets

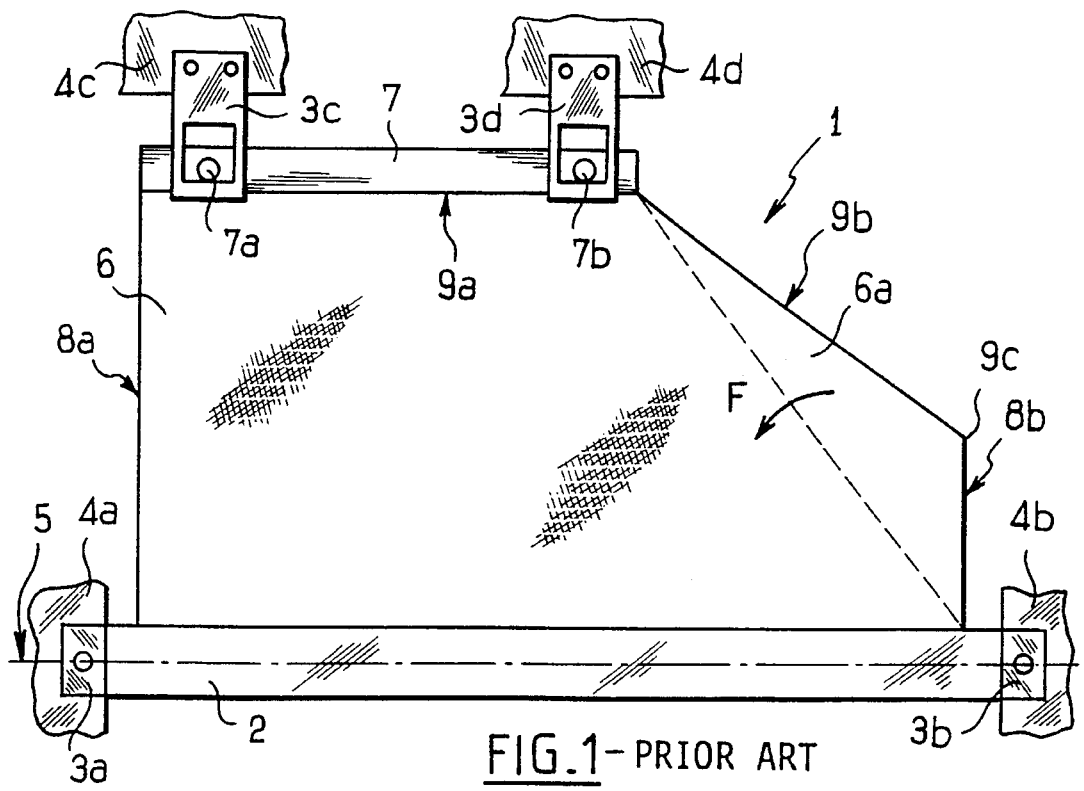
FIG. 1 – PRIOR ART
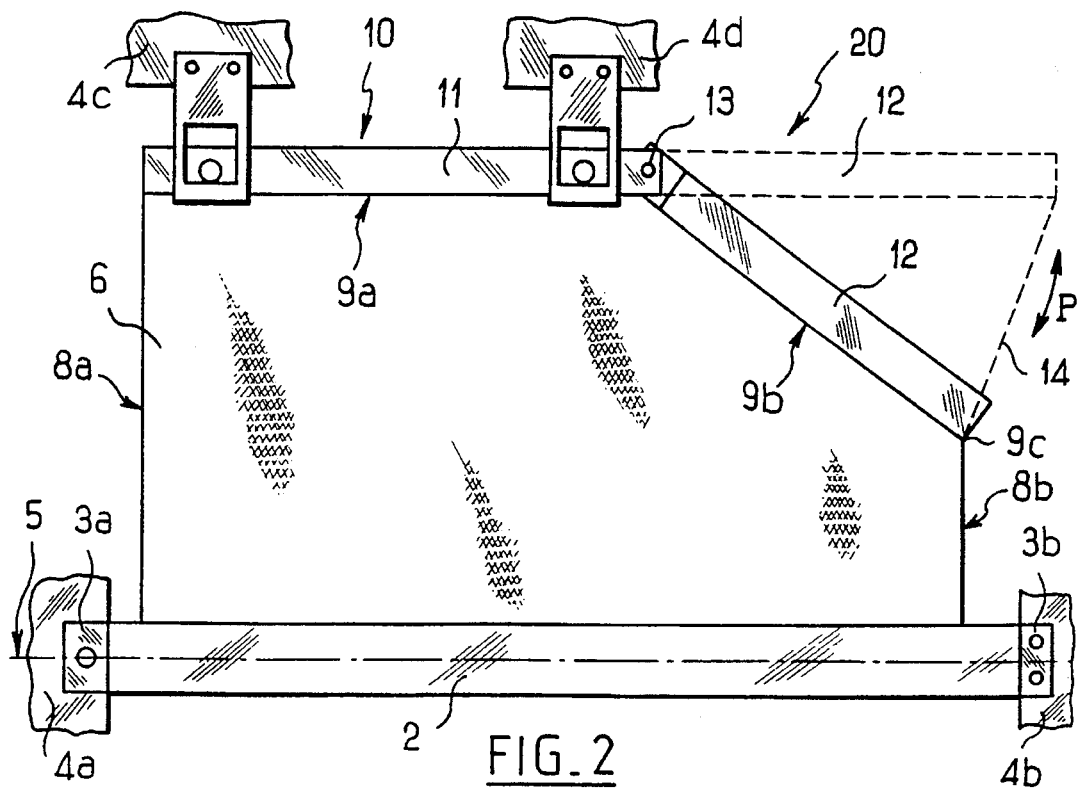
FIG. 2

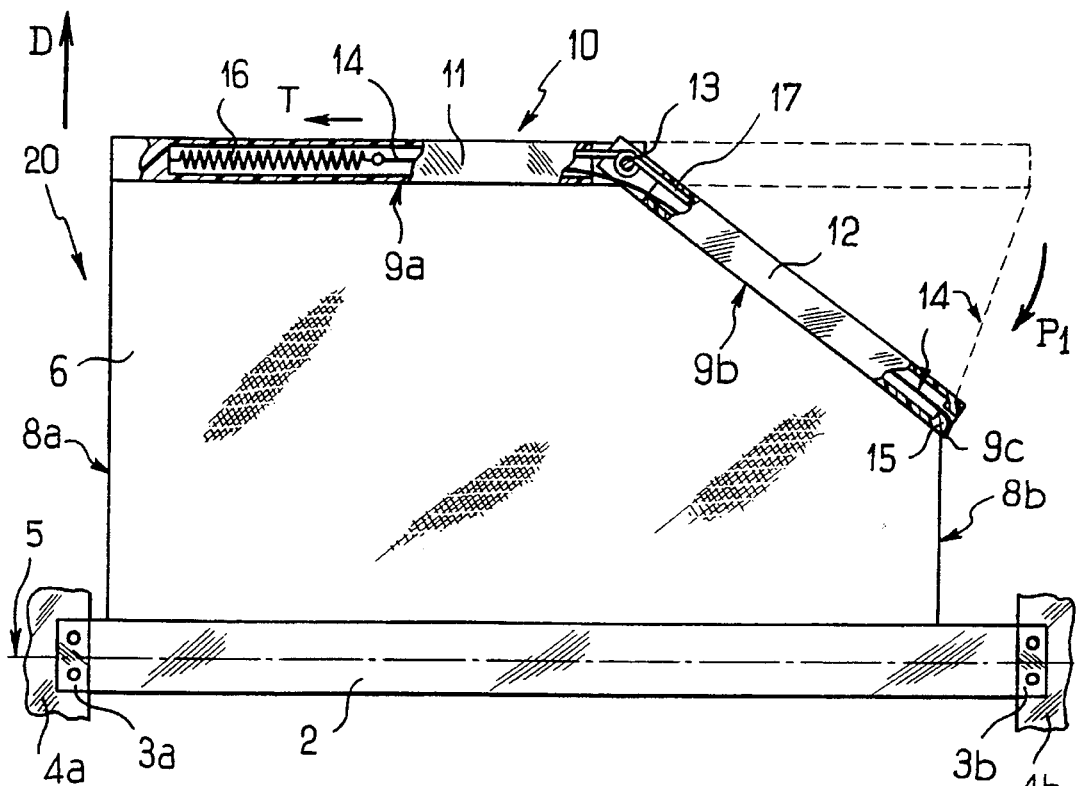
FIG_3
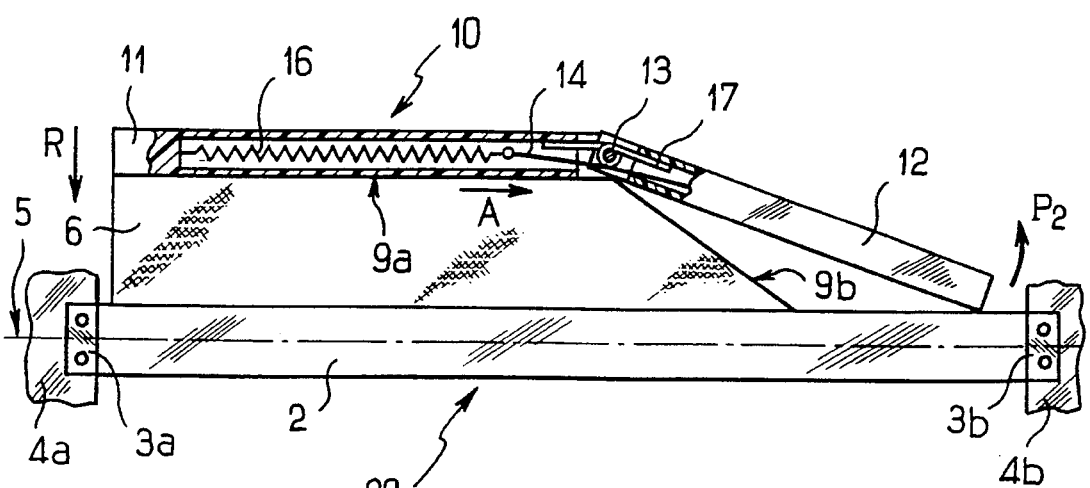
FIG_4

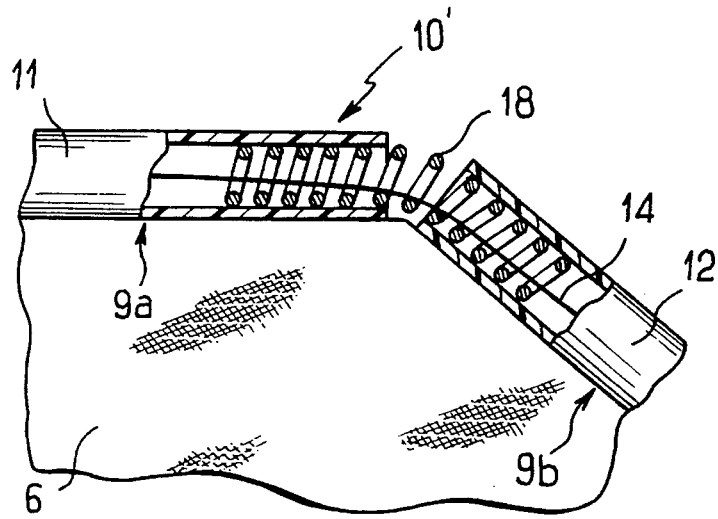
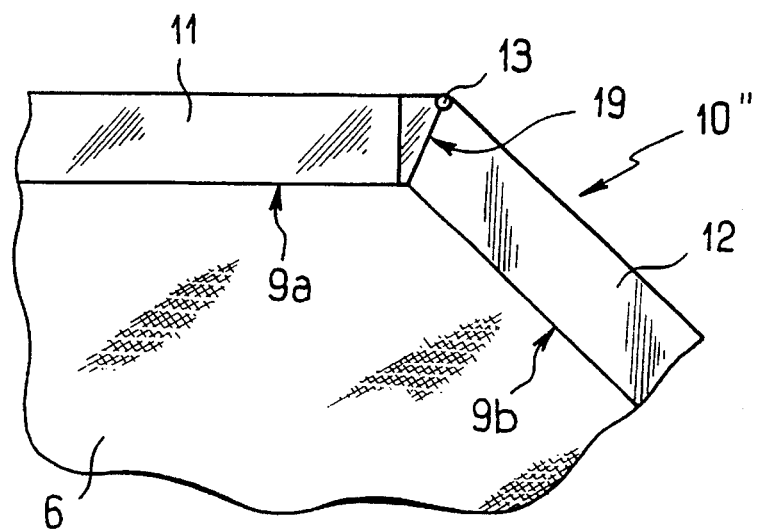
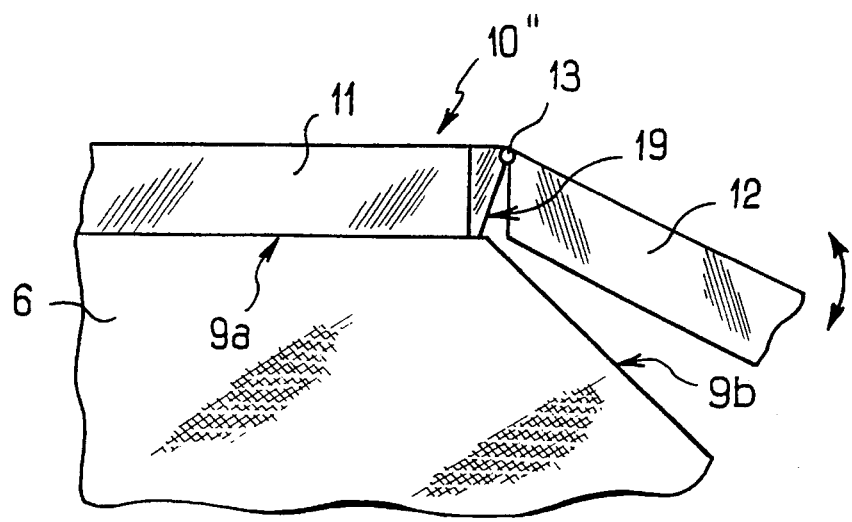

SELF-WINDING BLIND

The invention relates in general to a self-winding blind and in particular to a pull-bar for a blind fabric having a free end which includes one or more inclined segments.

BACKGROUND OF THE INVENTION

A blind, in particular for motor vehicles, includes a housing fixed to a structure adjacent to an edge of a bay to be covered and contains a winding device for winding a fabric about an axis, which fabric has a free edge fitted with a pull-bar extending parallel to its winding axis and has side edges which extend perpendicular to said axis. The winding device is subjected to a permanent torque opposing the winding out of the fabric and tending to hold the pull-bar against the housing. In order to adapt the shape of the wound-out fabric to the shape of the bay, it is sometimes necessary to cut the end of the fabric trapezoidally, i.e. to have an end edge (to which the pull-bar is fixed) having both a transverse or substantially transverse segment and an inclined segment which forms an angle with said transverse segment and with the side edge of the fabric.

In existing blinds, the pull-bar is fitted only to the transverse segment so as to allow the fabric to be wound completely into the housing. In such a configuration, when the fabric is wound out, the inclined segment and the side edge to which it is fastened delimit a triangular shaped section of fabric which tends to flop back onto the plane of the remainder of the wound-out fabric, as shown in FIG. 1.

OBJECTS AND SUMMARY OF THE INVENTION

The main object of the invention is to provide a blind having a fabric whose free edge includes an inclined segment and in which the above-mentioned problem of holding the fabric in place is eliminated.

To achieve this object, a self-winding blind is provided which is constituted by a housing containing winding means about an axis of a fabric having two side edges which are substantially perpendicular to the winding axis and having a free edge fitted with a pull-bar, said free edge including a first segment and at least one second segment inclined relative to said first segment and fastened at an obtuse angle to a side edge, the pull-bar including a portion fixed to the first segment, and at least one portion hinged to the fixed portion about an axis substantially perpendicular to the plane containing the wound-out fabric in order to pivot between a first position in which said portion extends along the second segment and a second position in which said portion extends in line with the fixed portion, while a flexible cord having a first end fixed to the pull-bar extends through a guide support disposed at the free end of the hinged portion of the pull-bar, its second end being fixed to the fabric where the second segment is fastened to the side edge, and associated with resilient tension means having the effect of pulling up the hinged portion of the pull-bar along the second segment.

This disposition ensures a connection between the angle of the section of fabric tending to fold back and the pull-bar which is itself rigid, so much so that when the fabric is wound out, the two segments of the free edge of the fabric are held in the same plane.

The resilient means which cooperate with the flexible cord may be constituted by a traction spring having one end fixed to the pull-bar and its other end connected to the flexible cord. It may also be grouped together in a single member with the flexible cord which is thus itself resilient and is directly attached to the pull-bar.

According to a characteristic of the invention the pull-bar includes return means for returning the hinged portion to its second position. Thus, the hinged portion of the pull-bar is subjected to a constant resilient return torque which prevents the fabric from folding under the effect of its own weight and that of the pull-bar by exerting a constant resilient tension force on said fabric. The return means may be constituted by a blade spring having ends which bear against the near ends of each of the portions of the pull-bar. It is also possible to make said hinge and return means of the pull-bar in a single piece that is resiliently deformable in the plane of the wound-out fabric and rigid against any other deformation, forming a coupling endpiece for coupling together the two portions of the pull-bar.

Similarly, it is also possible to provide a pull-bar having the fixed portion including an angular abutment which prevents the hinged portion from pivoting beyond its first position. The angular abutment thus fulfils the same function as that of the return means of the first embodiment: It prevents the hinged portion of the pull-bar from falling down onto the fabric and folding it. Furthermore, the position of said abutment is such that when the hinged portion of the pull-bar extends into its first position, its end is moved away from the corner of the fabric, such that the flexible cord ensures that the side edge of the fabric is under tension.

BRIEF DESCRIPTION OF THE DRAWINGS

Other characteristics and advantages of the invention appear on reading the following description of a particular non-limiting embodiment of the invention, given with reference to the accompanying figures in which:

FIG. 1 is a diagrammatic front view of a known blind, wound out and fitted in conventional manner with a simple pull-bar on the segment of its free edge which is parallel to the winding axis;

FIG. 2 is a diagrammatic front view of a wound-out blind, fitted with a pull-bar of the invention;

FIG. 3 is a similar view to FIG. 2 partially in section;

FIG. 4 is a similar view to FIG. 3, with the blind being partially wound in;

FIG. 5 is a fragmentary view showing in detail a variant embodiment of the hinge between the two portions of the pull-bar; and FIGS. 6 and 7 are views similar to FIG. 5 showing another variant embodiment of said hinge.

MORE DETAILED DESCRIPTION

In FIG. 1, a known blind 1 designed to cover a bay (not shown) includes a housing 2 fastened in known manner by tabs 3a and 3b to structural elements 4a and 4b and contains winding means (not shown) for winding a piece of fabric 6 about an axis 5. The fabric includes side edges 8a and 8b perpendicular to the axis 5 and a free edge fitted with a pull-bar 7.

Most of the bays to be covered are not rectangularly-shaped and to improve coverage it is often advantageous to cut out a trapezium-shaped piece of fabric 6. This is why, in the example shown, the free edge of said fabric includes a first segment 9a parallel to the winding axis 5, and a second segment 9b inclined relative to said axis. The first segment 9a need not be strictly parallel to the winding axis, at least when the fabric is wound out: blinds known as conical wind-in blinds exist in which the pull-bar inclines relative to the winding axis during winding out because the fabric is wound on a stepped or conical winding member. At corner 9c, the second segment forms an obtuse angle relative to the side edge 8b. The pull-bar 7 is fixed to the fabric 6 along the length of the segment 9a and includes studs 7a and 7b co-operating with fasteners 3c and 3d, fixed to structural elements 4c and 4d, in order to prevent the fabric 6 from winding in.

In such a configuration, if the fabric is wound out far enough for the corner 9c between the second segment 9b and the side edge 8b to extend outside the housing, then said second segment is no longer held under tension between the winding device and the pull-bar 7, so the triangular piece of fabric delimited by the segment 9b and the edge 8b can flap and may fold over. Such flapping increases or decreases depending on the stiffness of the material constituting the fabric. It is symbolized by arrow F in FIG. 1.

Like FIG. 1, FIG. 2 shows a wound-out blind 20, but it is fitted with a pull-bar 10 of the invention. The pull-bar is constituted by a portion 11 fixed to the fabric 6 along the first segment 9a and by a portion 12 hinged at one end to the end of the fixed portion 11 about an axis 13 substantially perpendicular to the plane containing the wound-out fabric 6 in order to pivot between a first position (shown in solid lines) in which said portion extends along the second segment 9b of the edge of the fabric 6 and a second position (shown in dashed lines) in which said portion extends in line with the fixed portion 11. This pivoting is symbolized by a double arrow P.

A flexible cord 14 connects the pull-bar 10 to the corner 9c between the second segment 9b and the side edge 8b. More precisely, as shown in FIGS. 3 and 4, the flexible cord 14 extends inside the pull-bar 10 which is hollow in this case, and passes through a guide support 15 disposed at the free end of the hinged portion 12 in order to be connected to the corner 9c of the fabric. Here, the guide support 15 is made in the form of an endpiece pierced by an outwardly flared outlet passage. A traction spring 16 housed in the fixed portion of the pull-bar is attached by one of its ends to said portion and is connected by its other end to the flexible cord 14. The spring thus connects the flexible cord 14 to the pull-bar 10, so that the cord exerts a resilient return force from the portion 12 on the corner 9c of the fabric. Furthermore, the spring 16 allows the flexible cord 14 to stretch so that its length can vary to enable the hinged portion 12 to move between its two positions.

In the embodiment shown, the pull-bar 10 includes return means 17 exerting a permanent return torque on the hinged portion urging it towards its second position. The means shown here are in the form of a hairpin spring wound about the hinge axis 13 and having ends which bear upon the adjacent ends of the portions of the pull-bar 10.

When the blind is wound out as in FIG. 3, the traction spring 16 pulls on the flexible cord 14 in the direction of arrow T in FIG. 3, so that the hinged portion 12 is urged to its first position against the spring 17 as shown by arrow $P_1$ in FIG. 3. It can be seen that the stiffness of the spring 17 must be small enough compared to the stiffness of the spring 16 to allow such pivoting. The fixed portion 11 of the pull-bar 10 is conventionally fastened by its tabs 3a and 3b to the structural elements 4a and 4b. The force exerted by the flexible cord 14 on the corner 9c of the fabric 6 ensures that the corner is held against the free end of the hinged portion 12 of the pull-bar 10. As said hinged portion is mounted to pivot in the plane of the fabric and only in said plane, it results that the segment 9b and the side edge 8b are held in said plane. In addition, the guide support 15 is disposed at a sufficient distance from the hinge axis 13 for the flexible cord 14 to ensure that the second segment 9b is tensioned under the action of the spring 16. As for the spring 17, it ensures resilient return of the hinged portion 12 towards its second position and thus keeps tension in the side edge 8b of the fabric connected to the corner 9c, thus avoiding any folding thereof which could be produced under the effect of its own weight and/or that of the hinged portion of the pull-bar.

When the fabric 6 is wound in along arrow R in FIG. 4, the free end of the hinged portion 12 comes into contact with the housing 2. The fabric winding means disposed inside said housing exerts a force on the fabric 6 which is strong enough to overcome the tension force of the spring 16 and therefore to provoke pivoting (shown by arrow $P_2$) of the hinged portion 12 towards its second position and also lengthening (shown by arrow A) of the spring 16 as a result of the movement of the end of the hinged portion 12 away from the corner 9c of the fabric. When the fixed portion 11 comes into abutment with the housing 2 and is held fixed thereagainst by the winding means, the hinged portion 12 extends into its second position, i.e. in line with the fixed portion 11. The free end of the portion 12 is held fixed against the housing 2 by the tension of the flexible cord 14.

In a variant embodiment of the invention, in the hinge between the portion 12 and the fixed portion 11 of the pull-bar 10', as shown in FIG. 5, a helical spring 18 is fitted inside the portions 11 and 12 which are both tubular in this case. The pull-bar 10' hinge and the resilient return means 17 are thus constituted by a single part. The helical spring 18 must also be resiliently deformable in the plane of the wound-out fabric and must be generally stiff for any other deformation. It can be replaced by any other resilient member forming a coupling endpiece and having the same characteristics, such as a tube of oblong section made of resilient plastics material.

In another variant 10" of the invention shown in FIGS. 6 and 7, the resilient means 17 can be removed and replaced by an angular abutment 19 formed on the fixed portion 11. The abutment prevents the hinged portion 12 from pivoting away from its second position beyond its first position. Thus, when the blind is wound out, the corner 9c of the fabric is held by the hinged portion 12 which rests in abutment in its first angular position. In addition, the position of said angular abutment is such that when the hinged portion 12 of the pull-bar extends into its first position its end is not in abutment with the corner 9c of the fabric when the fabric is tensioned, but on the contrary remains a small distance apart therefrom. In this way the flexible cord 14 ensures that the side edge 8b of the fabric 6 is tensioned and avoids possible folding thereof.

The invention is not limited to the embodiments described above, but encompasses any device providing the specified characteristics but with equivalent means. For example, the portions 11 and 12 can be hinged together in other ways, particularly by means of an attachment ligament or tongue linking the portions 11 and 12 together, the hinge can be made in molded plastics material integrally with the two portions of the pull-bar. It is also possible to make a blind having a fabric whose free edge has a plurality of inclined segments, the pull-bar itself thus including a plurality of hinged-together portions.

I claim:

1. A self-winding blind constituted by a housing containing winding means for winding a fabric about an axis, the fabric having two side edges and a free edge fitted with a pull-bar, which free edge comprises a first segment and at least one second segment inclined relative to said first segment toward the housing and meeting a side edge at a corner forming an obtuse angle, wherein the pull-bar includes a fixed portion fixed to the first segment, and at least one portion hinged to the fixed portion about an axis substantially perpendicular to the plane containing the wound-out fabric in order to pivot between a first position in which said portion extends along the second segment and a second position in which said portion extends in line with the fixed portion, wherein the blind includes a flexible cord extending through a guide support disposed at the free end of the hinged portion, said flexible cord having a first end fixed to the pull-bar and a second end fixed to the fabric at the corner between the second segment and the side edge, and wherein the blind includes resilient tension means associated with the flexible cord and having the effect of pulling the hinged portion up against the second segment.

2. A blind according to claim 1, wherein the resilient means which cooperate with the flexible cord are constituted by a traction spring having one end fixed to the pull-bar and its other end connected to the flexible cord.

3. A blind according to claim 1, wherein the pull-bar includes return means for returning the hinged portion to its second position.

4. A blind according to claim 3, wherein the return means of the hinged portion are constituted by a blade spring having ends which bear against the near ends of each of the portions of the pull-bar.

5. A blind according to claim 3, wherein the return means and the hinge of the hinged portion are made in a single piece that is resiliently deformable in the plane of the wound-out fabric and rigid against any other deformation, forming a coupling endpiece for coupling together the two portions of the pull-bar.

6. A blind according to claim 1, wherein the fixed portion includes an angular abutment preventing the hinged portion from pivoting beyond its first position.

7. A blind according to claim 6, wherein the position of the angular abutment is such that when the hinged portion of the pull-bar extends into its first position, the guide support is distant from the free edge corner of the fabric.

8. A self-winding blind constituted by a housing containing winding means for winding a fabric about an axis, the fabric having two side edges and a free edge fitted with a pull-bar, which free edge comprises a first segment and at least one second segment inclined relative to said first segment toward the housing and meeting a side edge at a corner forming an obtuse angle, wherein the pull-bar includes a fixed portion fixed to the first segment, and at least one portion hinged to the fixed portion about an axis substantially perpendicular to the plane containing the wound-out fabric in order to pivot between a first position in which said portion extends along the second segment and a second position in which said portion extends in line with the fixed portion, wherein the blind includes a flexible cord extending through a guide support disposed at the free end of the hinged portion, said flexible cord being resilient and having a first end fixed to the pull-bar and a second end fixed to the fabric at the corner between the second segment and the side edge, in order to pull the hinged portion up against the second segment.

9. A blind according to claim 8, wherein the pull-bar includes return means for returning the hinged portion to its second position.

10. A blind according to claim 9, wherein the return means of the hinged portion are constituted by a blade spring having ends which bear against the near ends of each of the portions of the pull-bar.

11. A blind according to claim 9, wherein the return means and the hinge of the hinged portion are made in a single piece that is resiliently deformable in the plane of the wound-out fabric and rigid against any other deformation, forming a coupling endpiece for coupling together the two portions of the pull-bar.

12. A blind according to claim 8, wherein the fixed portion includes an angular abutment preventing the hinged portion from pivoting beyond its first postion.

13. A blind according to claim 12, wherein the position of the angular abutment is such that when the hinged portion of the pull-bar extends into its first position, the guide support is distant from the free edge corner of the fabric.

* * * * *